US012792578B2

(12) United States Patent
Reddy et al.

(10) Patent No.: US 12,792,578 B2
(45) **Date of Patent: *Nov. 10, 2026**

(54) PLACEHOLDER CASE NODES AND CHILD CASE NODES IN A CASE MODEL

(71) Applicant: Open Text Corporation, Waterloo (CA)

(72) Inventors: Satyapal P. Reddy, Fremont, CA (US); Jeroen Van Rotterdam, Berkeley, CA (US); Muthukumarappa Jayakumar, Mountain House, CA (US); Ravikumar Meenakshisundaram, Pleasanton, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,120

(22) Filed: Dec. 13, 2023

(65) Prior Publication Data

US 2024/0111741 A1 Apr. 4, 2024

Related U.S. Application Data

(63) Continuation of application No. 16/714,241, filed on Dec. 13, 2019, now Pat. No. 11,899,635, which is a (Continued)

(51) Int. Cl.
*G06F 16/00* (2019.01)
*G06F 9/54* (2006.01)

(Continued)

(52) U.S. Cl.
CPC ............ *G06F 16/219* (2019.01); *G06F 9/542* (2013.01); *G06F 16/90* (2019.01); *G06F 16/93* (2019.01);

(Continued)

(58) Field of Classification Search
CPC ........ G06F 16/219; G06F 9/542; G06F 16/90; G06F 16/93; G06F 9/4498; G06Q 10/06316; G06Q 10/067
See application file for complete search history.

(56) References Cited

U.S. PATENT DOCUMENTS 8,606,691 B1 12/2013 Angermeier
11,893,066 B2 2/2024 Reddy et al.

(Continued)

FOREIGN PATENT DOCUMENTS

WO WO2005001627 1/2005
WO WO2007006613 1/2007
WO WO2007123706 1/2007

OTHER PUBLICATIONS

Office Action issued for U.S. Appl. No. 18/478,423, mailed May 28, 2024, 8 pages.

(Continued)

*Primary Examiner* — Syed H Hasan
(74) *Attorney, Agent, or Firm* — Sprinkle IP Law Group

(57) ABSTRACT

Case management systems and techniques are disclosed. In various embodiments, an indication to create a case instance is received. A case model definition is parsed to determine a hierarchical data model to be used to create the case instance and a placeholder data to be associated with a case node comprising the hierarchical data model. The case model definition is used to create the case instance, including by associating the placeholder data with the case node in the case instance as created.

20 Claims, 15 Drawing Sheets

Related U.S. Application Data continuation of application No. 14/502,132, filed on Sep. 30, 2014, now Pat. No. 10,515,124.

(60) Provisional application No. 62/031,590, filed on Jul. 31, 2014.

(51) Int. Cl.

| | |
|---|---|
| ***G06F 16/21*** | (2019.01) |
| ***G06F 16/90*** | (2019.01) |
| ***G06F 16/93*** | (2019.01) |
| ***G06Q 10/0631*** | (2023.01) |
| ***G06Q 10/067*** | (2023.01) |
| *G06F 9/448* | (2018.01) |

(52) U.S. Cl.

CPC ..... *G06Q 10/06316* (2013.01); *G06Q 10/067* (2013.01); *G06F 9/4498* (2018.02)

(56) References Cited

U.S. PATENT DOCUMENTS

| | | | | |
|---|---|---|---|---|
| 11,941,068 | B2 | 3/2024 | Reddy et al. | |
| 12,164,579 | B2 | 12/2024 | Reddy et al. | |
| 12,229,199 | B2 | 2/2025 | Reddy et al. | |
| 12,613,925 | B2 | 4/2026 | van Rotterdam et al. | |
| 2001/0007987 | A1 | 7/2001 | Igata | |
| 2001/0034701 | A1* | 10/2001 | Fox | G06Q 40/03 705/38 |
| 2002/0040339 | A1* | 4/2002 | Dhar | G06Q 10/10 705/38 |
| 2004/0162906 | A1 | 8/2004 | Griffin | |
| 2004/0172394 | A1 | 9/2004 | Smolsky | |
| 2005/0027651 | A1* | 2/2005 | DeVault | G06Q 20/10 705/38 |
| 2006/0064434 | A1* | 3/2006 | Gilbert | G06Q 10/06 |
| 2006/0074736 | A1 | 4/2006 | Shukla | |
| 2006/0253478 | A1* | 11/2006 | Graham | G06F 40/174 |
| 2007/0050335 | A1 | 3/2007 | Kashima | |
| 2007/0233709 | A1* | 10/2007 | Abnous | G06F 16/22 |
| 2008/0104022 | A1 | 5/2008 | Ronca | |
| 2008/0112006 | A1 | 5/2008 | Sambre | |
| 2008/0201190 | A1* | 8/2008 | Compton | G06Q 40/02 707/999.107 |
| 2009/0171897 | A1* | 7/2009 | Spinola | G06Q 10/10 707/999.102 |
| 2009/0240550 | A1 | 9/2009 | McCarty | |
| 2011/0047058 | A1 | 2/2011 | Erbey | |
| 2015/0006642 | A1* | 1/2015 | Viitala | H04L 51/02 709/206 |
| 2015/0347472 | A1 | 12/2015 | Gupta | |
| 2023/0409648 | A1 | 12/2023 | van Rodderdam et al. | |
| 2024/0020344 | A1 | 1/2024 | Reddy et al. | |
| 2024/0176825 | A1 | 5/2024 | Reddy et al. | |

OTHER PUBLICATIONS

Office Action issued for U.S. Appl. No. 18/436,114, mailed Sep. 11, 2024, 7 pages.

Notice of Allowance issued for U.S. Appl. No. 18/478,423, mailed Sep. 13, 2024, 8 pages.

Office Action issued for U.S. Appl. No. 18/363,540, mailed Apr. 24, 2025, 34 pages.

Bounhas et al., "A Hierarchical Approach for Semi-Structured Document Indexing and Terminology Extraction," 2010 International Conference on Information Retrieval & Knowledge Management (CAMP), pp. 315-320.

Office Action issued for U.S. Appl. No. 18/363,540, mailed Aug. 12, 2025, 18 pages.

Notice of Allowance issued for U.S. Appl. No. 18/363,540, mailed Dec. 19, 2025, 9 pages.

* cited by examiner

PLACEHOLDER CASE NODES AND CHILD CASE NODES IN A CASE MODEL

CROSS-REFERENCE TO RELATED APPLICATIONS

This application is a continuation of, and claims a benefit of priority under 35 U.S.C. 120 of the filing date of U.S. patent application Ser. No. 16/714,241, filed Dec. 13, 2019, issued as U.S. Pat. No. 11,899,635, entitled "PLACEHOLDER CASE NODES AND CHILD CASE NODES IN A CASE MODEL," which is a continuation of, and claims a benefit of priority under 35 U.S.C. 120 of the filing date of U.S. patent application Ser. No. 14/502,132, filed Sep. 30, 2014, issued as U.S. Pat. No. 10,515,124, entitled "PLACEHOLDER CASE NODES AND CHILD CASE NODES IN A CASE MODEL," which claims priority under 35 U.S.C. 119 (e) to U.S. Provisional Patent Application No. 62/031,590, filed Jul. 31, 2014, entitled "CASE MODEL CREATION, CONTENT, AND BEHAVIOR," all of which are hereby expressly incorporated by reference for all purposes.

BACKGROUND

Case management systems, software, and/or cloud-based or other electronically-provided case management services (collectively, "Case Management Systems") are used to automate the management of complex sets of documents or other content and associated business or other processes, particularly in situations in which the documents or other content that may need to be managed for respective particular instances of a case model/type (e.g., a loan application) may not be the same for each instance and the processing required and/or selected to be performed may not be the same for each instance.

A case model ("Case Model") typically describes a type of case, instances of which are to be managed by a Case Management System. As opposed to very structured business process that defines a predetermined work flow that does not vary from instance to instance, using a Case Model one can model ad hoc actions and define responses thereto with mini workflows, enabling the processing of respective instances of a Case Model to be determined dynamically at runtime based, e.g., on events, context data, user input, dynamic evaluation of documents or other content, etc. As a result, each instance of a Case Model (e.g., the respective loan applications of different applicants) may follow its own course as determined at each step by processing as defined in applicable portions of the Case Model.

BRIEF DESCRIPTION OF THE DRAWINGS

Various embodiments of the technology are disclosed in the following detailed description and the accompanying drawings.

DETAILED DESCRIPTION

The technology described herein can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

Providing placeholder case nodes and sub nodes in a case model is disclosed. In various embodiments, any case node or case leaf node comprising a hierarchical/nested container model of a case model may be designated as a placeholder. When an instance of case model or a specific case node is created, placeholders are created for each of the containers or leaf nodes (e.g., documents) marked as such in the case model. In various embodiments, by virtue of creating these placeholders, there will be some actions/behavior available on those case model nodes, such as filling the placeholders (e.g., with meta-data or other attributes, a document or other content, etc.), due dates by which those placeholders need to be filled, etc.

Figure 1:
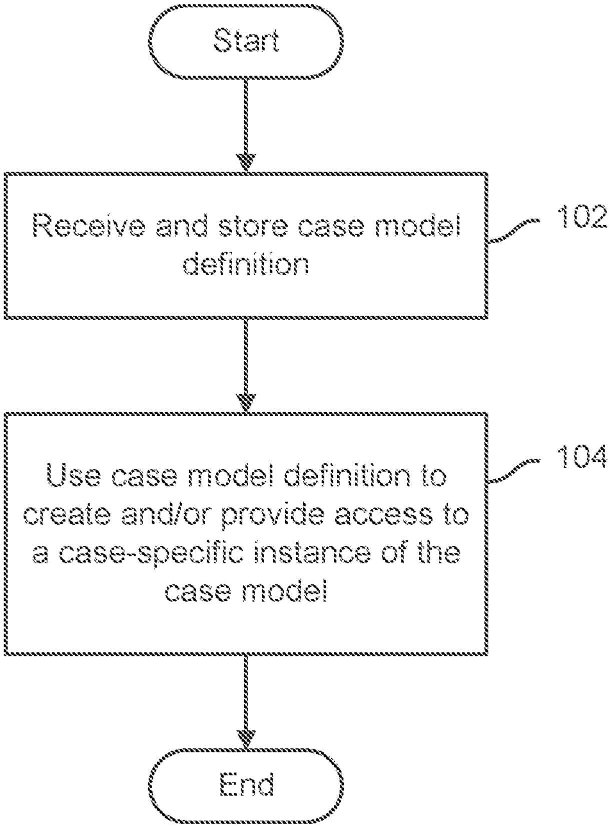
FIG. 1 is a flow chart illustrating an example embodiment of a process to perform case management.

FIG. 1 is a flow chart illustrating an example embodiment of a process to perform case management. In the example shown, a case model definition is received and stored (102). The case model definition is used to create new instances based on the case model, sometimes referred to herein as "case instances" or "case management instances", and/or to provide access to previously-created instances (104). For example, a case model may be defined and stored for a loan application and associated processes. Case instances may be created based on the case model and each respective case instance used to manage a corresponding loan application, for example by different respective loan applicants.

A case model typically describes a case management system. Using a case model, one can model ad hoc actions with mini workflows, for example, as opposed to very structured process that defines an end-to-end business workflow. In various embodiments, a case model comprises a hierarchical/nested container model (sometimes referred to herein as a "hierarchical data model"), and may in addition define case roles, case phases (states), and/or permissions. In some embodiments, permissions may be defined for each case node and/or level in the hierarchy, and may vary in some embodiments based at least in part on the respective phases (states) of a state machine defined for a case node.

In various embodiments, a case model may include a hierarchical/nested container model. This model represents how the data within a case is organized and what data is captured during runtime. Each node in the hierarchy is sometimes referred to herein as a "case node". Case nodes at the lowest level of a case model hierarchy may be referred to as "case leaf nodes" or simply "leaf nodes". "Case leaf nodes" in various embodiments may point to a specific business object or document type.

The term "case role" is used herein to refer to user roles that have been defined in a case model. In various embodiments, users may be assigned to case roles with respect to instances of a case model, and at each case node in the case model permissions may be designated by reference to one or more case roles. During runtime in some embodiments members may be added or removed from these roles at case node instances corresponding to respective instances of a type of case as defined in a case model.

In various embodiments, at each case node a metadata model that defines one or more traits and/or associated behavior may be defined.

In various embodiments, a case model as described herein may be created using a domain-specific or other development module or tool. For example, reusable elements, such sample case nodes typical of those used in the domain (e.g., documents, case roles, behaviors, etc. Typically associated with a loan application process, a new drug approval application, etc.), primitives usable to define a state machine and/or associated processing for respective case nodes, etc., may be provided. For example, an application programming interface (API) may be defined, and/or a visual or other case model development tool may be provided.

In various embodiments, a case model definition is embodied in an xml or other structured data file. A case management system and/or platform is provided, which is configured (e.g., by software) to load a case model definition, parse the definition, and create an instance of the case model based on the definition. Instance-specific attributes and/or state information or other metadata may be stored in a case model instance data store, e.g., a database. At runtime, the case model definition file and the case model instance data for a given instance are used by the disclosed case management system to implement the case model instance, including by performing processing and managing case model instance associated content per the case model definition, in light of the current values of the case model instance data for that instance.

Figure 2:
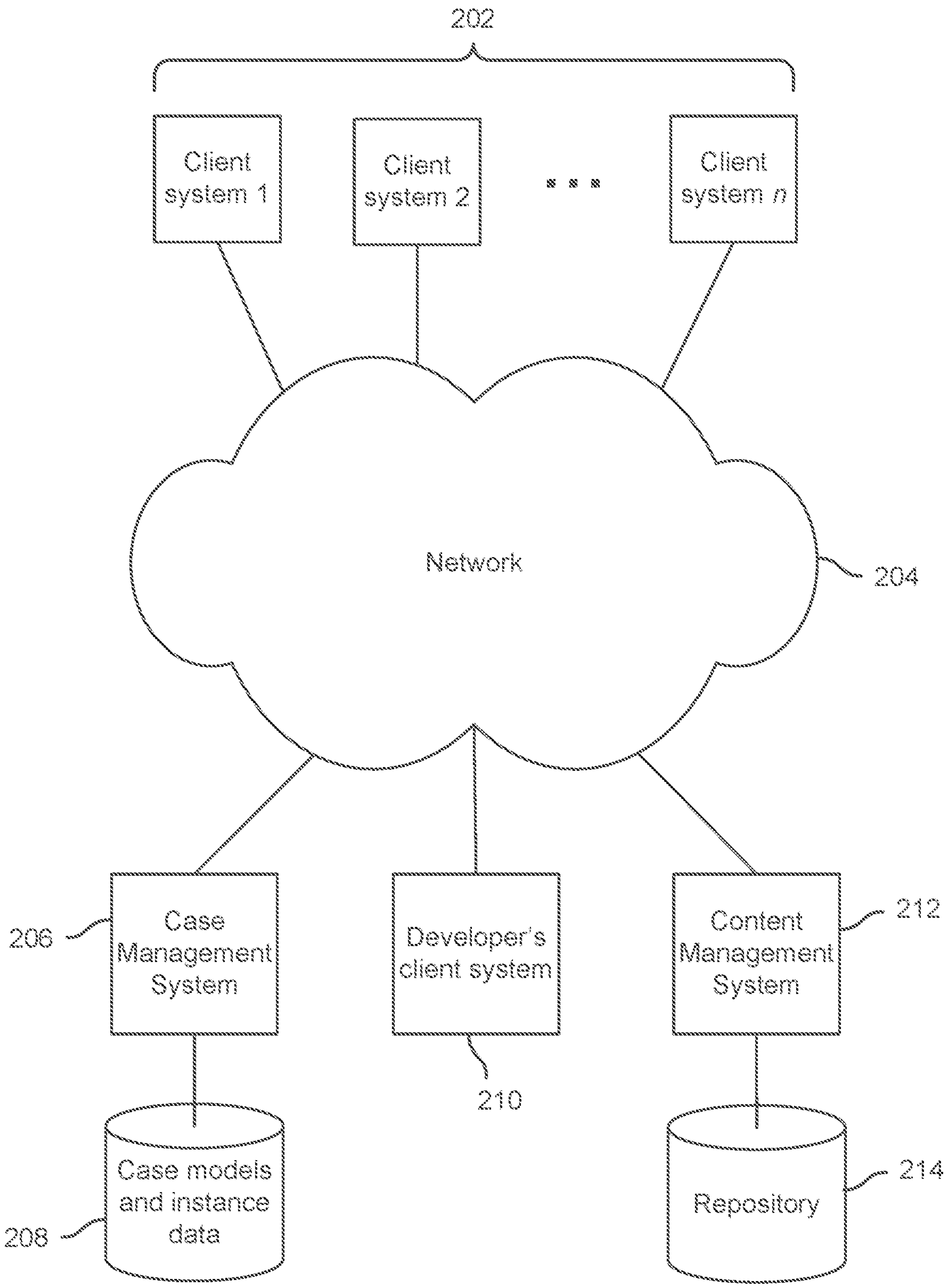
FIG. 2 is a block diagram illustrating an example embodiment of a case management system and environment.

FIG. 2 is a block diagram illustrating an example embodiment of a case management system and environment. In the example shown, client systems 202 are connected via a network 204, e.g., the Internet, to a case management system 206. In various embodiments, the case management system 206 may be configured to implement the process of FIG. 1. Case management system 206 uses case models stored in data storage 208 to provide case management services with respect to case management instances, the instance variable data values of which also are stored, in this example, in data storage 208. For example, one or more of clients 202 may connect via network 204 to case management system 206 to obtain access to case management services. For example, case management system 206 may expose a "case management system as a service", e.g., as a web service, enable clients 202 to connect to case management system 206, create case management instances based on case models stored in data storage 208. The users of client system 202 may be prompted to provide data values and/or other user input to populate case management instances with metadata, user data, documents, etc., and/or such other user input as may be required to advance case instances through case management processing as defined in the case model.

In the example shown in FIG. 2, a case model developer system 210, e.g., a client computer system, also can connect to case management system 206 via network 204. In some embodiments, a case model development user interface and/or service may be accessed and used to define a case model. For example, a visual or other developer tool may be presented to enable a developer using client system 210 to define a case model and cause the case model to be stored in data storage 208 and deployed by case management system 206. In some embodiments, deployment of a case model includes making the case model available to be used to create case management instances based on the model, and to use the case model to perform with respect to each such instance the case management processing as defined in the case model.

In various embodiments, a case model may indicate one or more content objects to be associated with respective instances of a case model. The case model may include metadata and associated behaviors to enable instance-specific content objects (e.g., documents) to be associated with case leaf nodes of a case instance. In the example shown in FIG. 2, content objects may be accessed via a content management system 212 configured to manage content objects stored in an associated content repository 214. In various embodiments, case management system 206 may be configured to use instance variables associated with a given case instance and metadata and/or behaviors defined in an associated case model to interact programmatically with content management system 212 to obtain and/or manage documents or other content objects associated with a case instance. In some embodiments, case management system 206 may be configured, e.g., via the case model, to invoke services and/or other functionality of content management system 212 with respect to such documents or other content objects.

Figure 3:
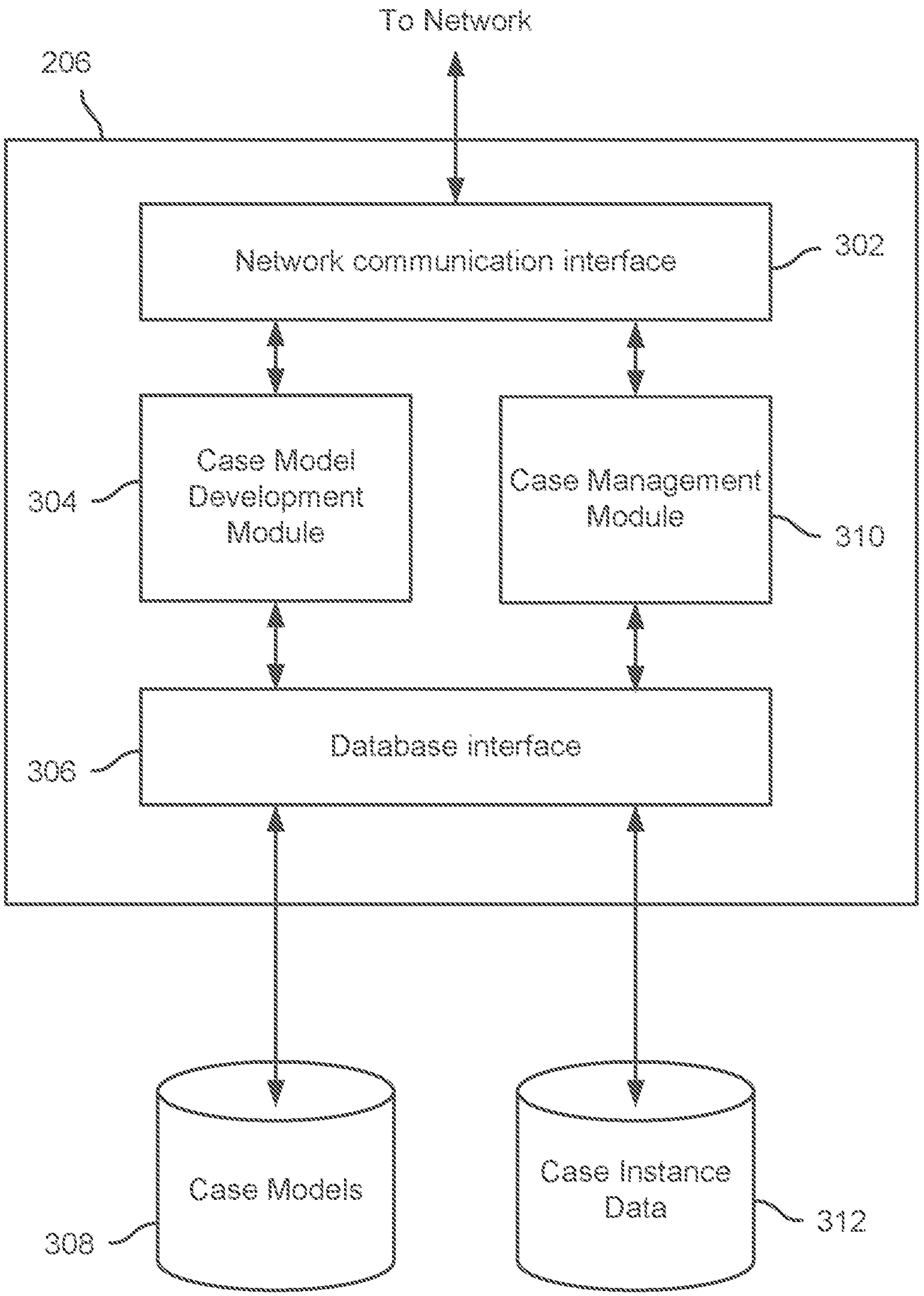
FIG. 3 is a block diagram illustrating an example embodiment of a case management system.

FIG. 3 is a block diagram illustrating an example embodiment of a case management system. In some embodiments, the case management system of FIG. 3 corresponds to case management system 206 of FIG. 2. In the example shown, case management system 206 includes a network communication interface 302, such as a wireless or other network interface card, to provide network connectivity, e.g., to network 204 of FIG. 2. A case model development module 304 is accessible to developers via network communication interface 302 and may be used to create and/or modify case model definitions. In some embodiments, a visual or other user interface is provided, via network communication interface 302, to enable case models to be created and/or modified. For example, a developer may use a browser to access the developer user interface in some embodiments. Case model definitions are stored by case model development module 304 by using a backend database (or other data storage) interface 306 to store the case model(s) in case model store 308.

Referring further to FIG. 3, the case management system 206 includes a case management module 310. In various embodiments, case management module 310 includes functionality to enable users, e.g., users of client systems 202 of FIG. 2, to create and/or use case management instances based on case models stored in case model store 308. Case management module 310, for example, may expose a web or other interface to remote users and may receive via said interface a request to create and/or access a case instance. Case management module 310 uses database interface 306 to obtain an associated case model definition from case model store 308, to use the case model to instantiate case instances. Instance variables are stored by case management module 310 in case instance data store 312.

Figure 4:
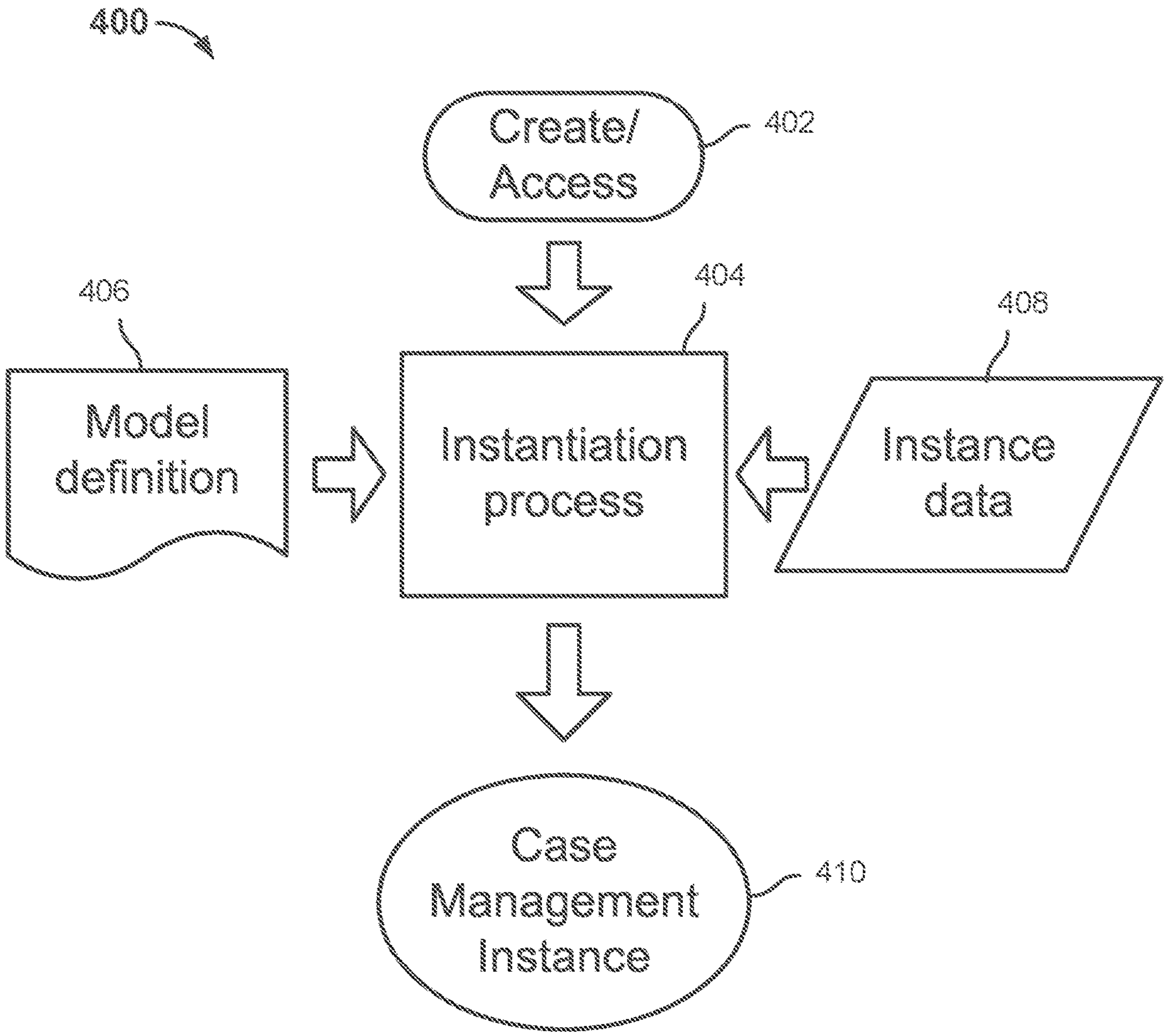
FIG. 4 is a diagram illustrating an example embodiment of a process and system to create and/or provide access to case management instances.

FIG. 4 is a diagram illustrating an example embodiment of a process and system to create and/or provide access to case management instances. In some embodiments, the process of FIG. 4 may be implemented by a case management system and/or a component thereof, such as case management module 310 of FIG. 3. In the example shown, case management system 400 receives a request 402 to create or access a case management instance and invokes instantiation process 404. Instantiation process 404 uses a case model definition 406 associated with the request, e.g., a case model indicated explicitly and/or otherwise associated with data comprising the request 402, and case management instance data 408 associated with the case management instance, to instantiate and provide access to a case management instance 410.

In various embodiments, a case model definition such as model definition 406 may include an eXtensible Markup Language (XML) file or other structured data, which the case management system is configured to parse and use to construct case instances based on the case model. For example, the hierarchical data structure may be defined, along with metadata and associated behaviors for each case node. A case management instance, such as case management instance 410, may include an in memory instance of a data structure defined in case model definition 406, which is used to store instance variables, such as instance data 408 in this example.

Figure 5:
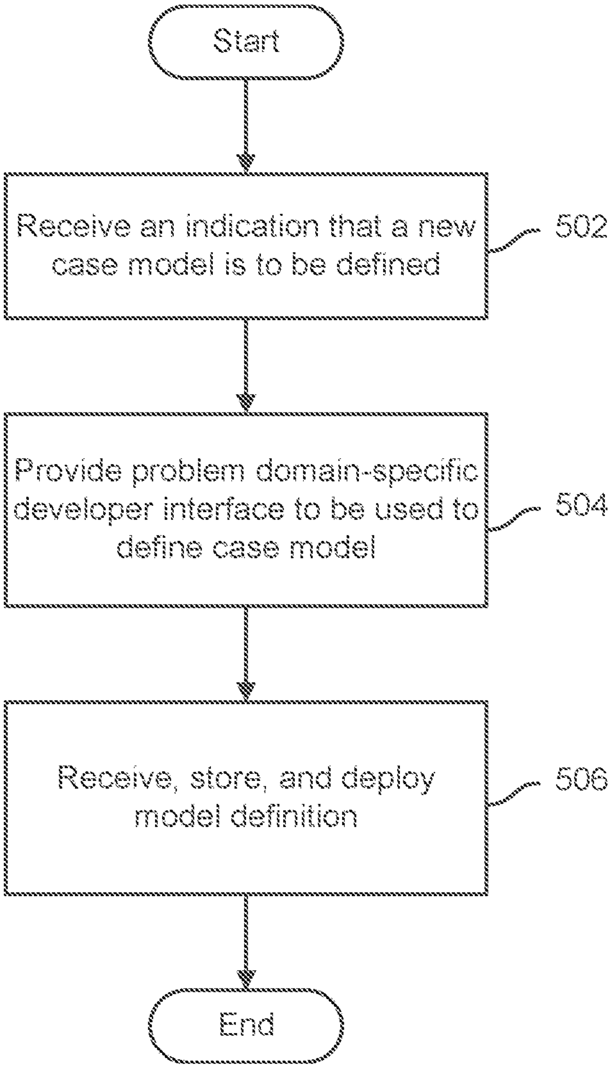
FIG. 5 is a flow chart illustrating an example embodiment of a process to receive and store a case model.

FIG. 5 is a flow chart illustrating an example embodiment of a process to receive and store a case model. In some embodiments, the process of FIG. 5 is used to implement step 102 of FIG. 1 and is performed by a case management system, such as case management system 206 of FIGS. 2, e.g., case model development module 304 of FIG. 3. In the example shown, an indication that a new case model is to be defined is received (502). A problem domain-specific developer interface to be used to define the case model is provided (504). For example, in some embodiments a developer may indicate in a request to define a new case model, and/or may be prompted to indicate, a "problem domain" with which the case model is associated, such as a loan application, an employment application, a product development or other business project, a healthcare or other patient, a claim for reimbursement or benefits, or a matter being handled by a professional or personal service provider, such as a lawsuit, home renovation project, etc. In various embodiments, the problem domain-specific developer interface provides access to problem domain-specific elements to assist the developer in defining the case model. For example, a loan application typically is initiated by a loan applicant submitting an application, and typically involves gathering information to verify and evaluate the applicant's identity, financial assets, income, creditworthiness, etc. In some embodiments, a template may be provided to be used as a starting point. The developer uses visual or other tools to customize the template as desired to define a case model.

Once the developer has completed and submitted the case model definition, the case model definition is received, stored, and deployed (506). In some embodiments, a runtime representation of the definition is processed, e.g., upon submission by the developer, to generate an XML or other structured data file that embodies the case model as defined. Deployment in various embodiments includes making the case model definition available to be used to instantiate case management instances based on the case model, e.g., individual loan application cases.

Figure 6:
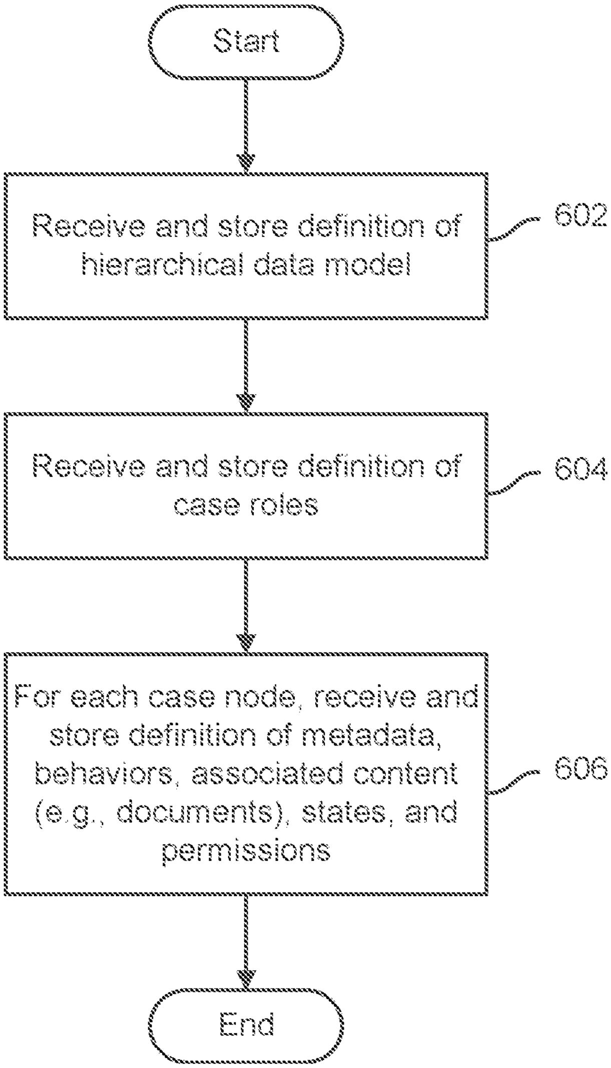
FIG. 6 is a flow chart illustrating an example embodiment of a process to receive and store a case model.

FIG. 6 is a flow chart illustrating an example embodiment of a process to receive and store a case model. In some embodiments, the process of FIG. 6 is included in step 506 of FIG. 5. In the example shown, a definition of a hierarchical/nested data model is received (602). For example, a user interface that enables a developer to drag and drop case nodes onto a canvass and to indicate hierarchical relationships between case nodes may be provided and used by the developer to define a hierarchical/nested data model. A definition of case roles is received and stored (604). For example, a "loan application" case model may include user roles such as "loan initiator", "underwriter", "appraiser", etc. For each case node in the hierarchical/nested data model, a definition of metadata, behaviors, content (e.g., documents), states/phases (and transitions between states/phases), and/or permissions (e.g., by case role) is received (606). For example, in various embodiments a developer interface may be provided to enable a developer to select a case node and be presented with an interface to define a state machine for that case node.

Figure 7:
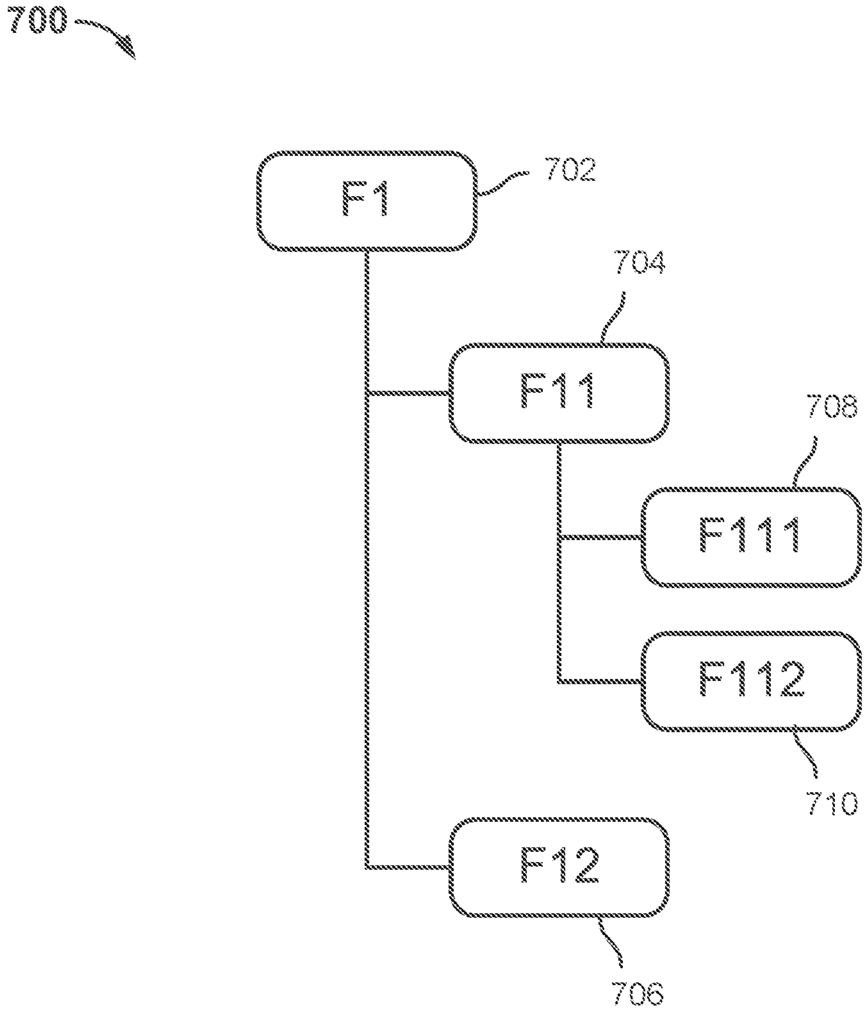
FIG. 7 is a block diagram illustrating an example of a hierarchical data model in an embodiment of a case management system.

FIG. 7 is a block diagram illustrating an example of a hierarchical data model in an embodiment of a case management system. In various embodiments, a case model, such as one defined using the processes of FIGS. 5 and 6, may include a hierarchical/nested container model, such as the one shown in FIG. 7. In the example shown, hierarchical/nested container model 700 includes a root node 702 at a first (highest) hierarchical level. At a first hierarchical level below the root node, nodes 704 and 706 are included. Finally, in a lowest hierarchical level (in this example), node 704 has two "case leaf nodes" 708 and 710. In various embodiments, metadata, behaviors, permissions, etc. that have been defined for a case node extend (or in some embodiments may at the option of the case model developer be extended) to child case nodes of the case node at which such metadata, behaviors, permissions, etc. have been defined.

Figure 8:
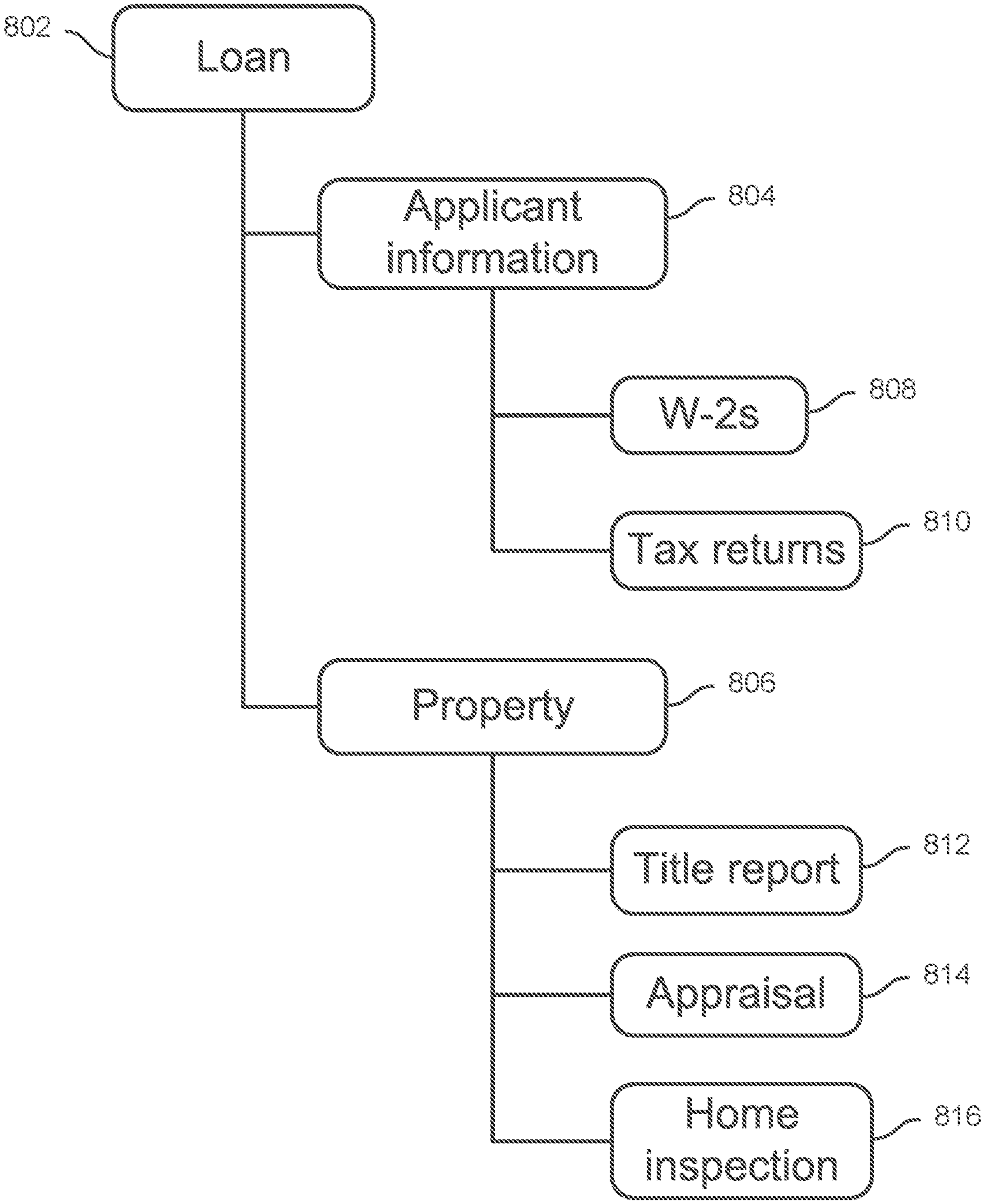
FIG. 8 is a block diagram illustrating an example of a hierarchical data model in an embodiment of a case management system.

FIG. 8 is a block diagram illustrating an example of a hierarchical data model in an embodiment of a case management system, such as case management system 206 of FIG. 2. In particular, a hierarchical/nested container model for a home loan application is illustrated. In the example shown, each instance of a "loan" case includes a root node 802 and two first level sub-nodes 804 and 806, in this example one (804) for financial information of the applicant and associated processing, and another (806) for information and processing associated with the home to be purchased using the loan. The "applicant information" sub-node 804 includes a first case leaf node 808 for Forms W-2 and a second case leaf node 810 for the applicant's tax returns. "Property" sub-node 806 includes case leaf nodes 812, 814, and 816 for the title report, appraisal report, and home inspection report, respectively. In various embodiments, the case model definition may include for each case node a definition of metadata and/or behaviors for that case node. For case leaf nodes, such as case leaf nodes 808, 810, 812, 814, and 816, the case model definition may include information regarding documents or other content objects to be associated with such nodes, including in some embodiments an identification of a storage location in which such documents are to be stored, e.g., in a content repository such as repository 214 of FIG. 2 associated with a content management system such as content management system 212 of FIG. 2.

Figure 9:
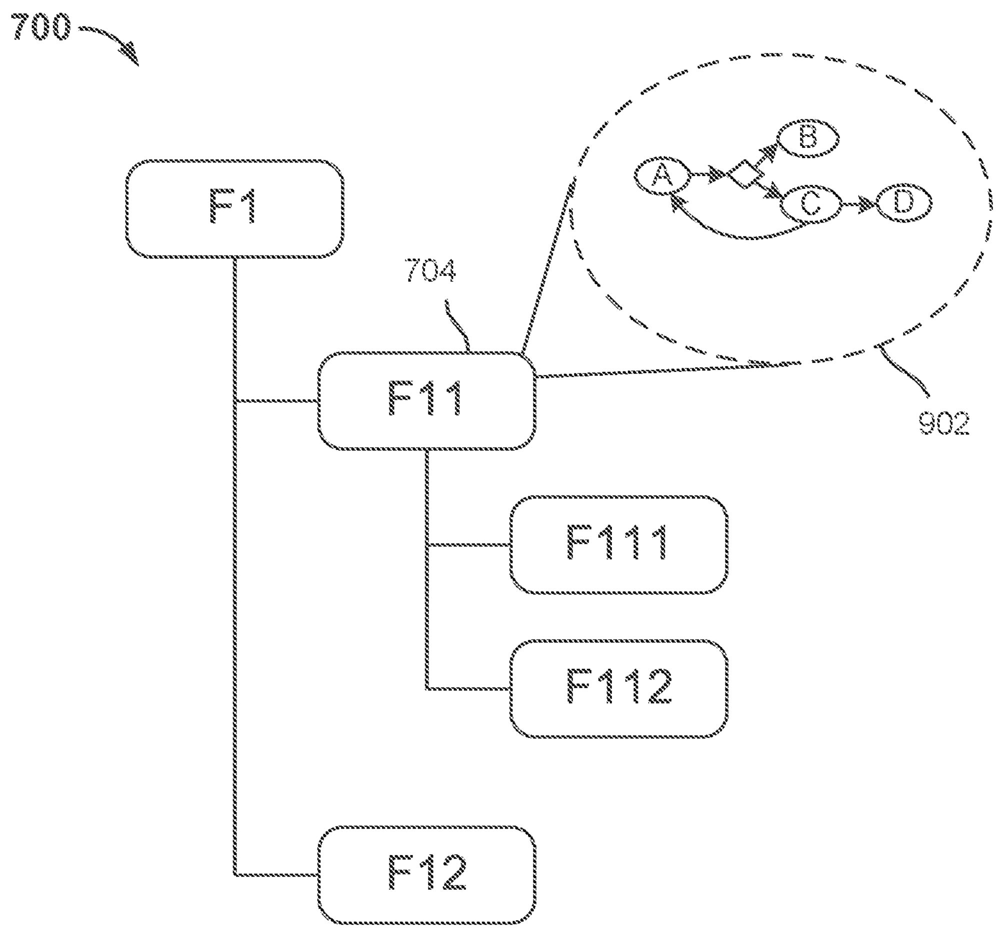
FIG. 9 is a block diagram illustrating an example of a hierarchical data model and associated state machine in an embodiment of a case management system.

FIG. 9 is a block diagram illustrating an example of a hierarchical data model and associated state machine in an embodiment of a case management system. In various embodiments, the hierarchical data model and associated state machine of FIG. 9 may be included in a case model definition defined and/or deployed via a case management system such as case management system 206 of FIGS. 2 and 3. In the example shown, a state machine 902 has been defined for and associated with case node 704 of hierarchical/nested container model 700 of FIG. 7.

In various embodiments, for any case node within the hierarchical/nested container model, a state machine can be defined and the actions that can be used to transition between different phases/states of the state machine defined for that case node may be specified. These actions could be used during runtime to transition between states.

In the example shown in FIG. 9, a state machine 902 has been defined and associated with a specific case node in the hierarchical model shown in FIG. 7, specifically node "F11" (704). In various embodiments, a document or other content associated with node "F11"; traits, such as metadata and/or associated behavior associated with node "F11"; etc. may be transformed, reviewed, and/or otherwise involved with processing that may result, in a given case model instance, in transitions being made between states of the state machine 902 defined for case node "F11" in this example.

In various embodiments, enabling a state machine to be defined and associated with a case node comprising a hierarchal/nested container model provides a flexible, dynamic framework within which ad hoc actions and/or information can be responded to, in a manner determined dynamically based on the circumstances of a given instance of a case, with the result that the actions and/or processing performed at a given case node, and/or the consequences of such actions and/or processing, may be different for one instance of the case model than for another instance of the case model.

In various embodiments, a state machine engine may be included in a case management system, such as case management system 206 of FIG. 2, to enable a state machine defined for a case node, such as state machine 902 of FIG. 9, to be implemented and associated functionality to be provided. For example, in some embodiments, case management module 310 of FIG. 3 may include a state machine engine. In some embodiments, the state machine engine may receive and parse state machine definition portions of a case model definition, and may use such portions to create and manage runtime data structures associated with the respective defined states (phases) of the state machine and transitions between them. In some embodiments, state variables associated with a current state of a case node-specific state machine for a given instance of a case model may be stored persistently with other case management instance data, for example in a case instance data store such as data store 312 of FIG. 3.

Figure 10:
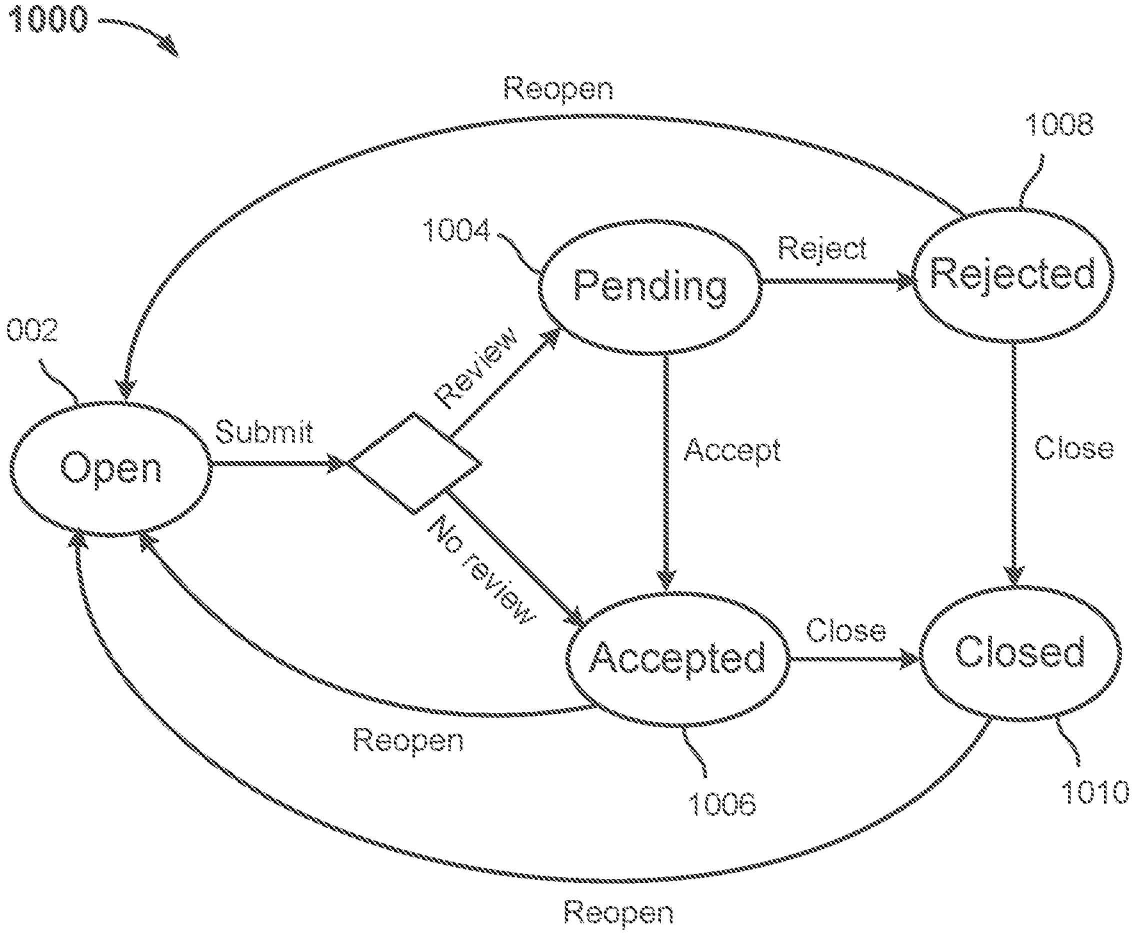
FIG. 10 is a block diagram illustrating an example of a state machine defined for a case node in an embodiment of a case management system.

FIG. 10 is a block diagram illustrating an example of a state machine defined for a case node in an embodiment of a case management system. In various embodiments, the state machine of FIG. 10 may be included in a case model definition defined and/or deployed via a case management system such as case management system 206 of FIGS. 2 and 3. In the example shown, state machine 1000 includes an "open" state 1002, associated for example with beginning processing of a received document, such as one created locally, uploaded, or otherwise provided by a user. In the example shown, a transition out of the "open" state 1002 may occur upon a "submit" option being selected, e.g., by a user, a business process, an external service, etc. If the item was submitted with an indication that a "review" is required (e.g., a reviewer is named or otherwise indicated), the state machine transitions to a "pending" state 1004, indicating the required review is pending. If no review is required, the state machine instead transitions directly to an "accepted" state 1006. If review was required and the reviewer "accepts" the item, a transition from "pending" state 1004 to "accepted" state 1006 occurs. If instead the reviewer were to "reject" the item, in this example a transition from "pending" state 1004 to "rejected" state 1008 would occur. From either "accepted" state 1006 or "rejected" state 1008, a "close" transition to a "closed" state 1010 could occur. Finally, in this example, "reopen" transitions back to "open" state 1002 could occur from the "accepted" state 1006, "rejected" state 1008, and/or "closed" state 1010.

Note that for a given instance of a case model with which the state machine 1000 of FIG. 10 is associated, the states through which the state machine 1000 of FIG. 10 may transition for that instance may be different than for one or more other instances. Also, for a given instance, depending on the state machine definition included in the case model definition, the user data associated with that instance at applicable times, and potentially user actions and decisions made in response to case information, the state machine 1000 may be transitioned to/through a given state more than once (e.g., via the "reopen" transitions), potentially resulting in different outcomes of processing associated with that state.

Figure 11:
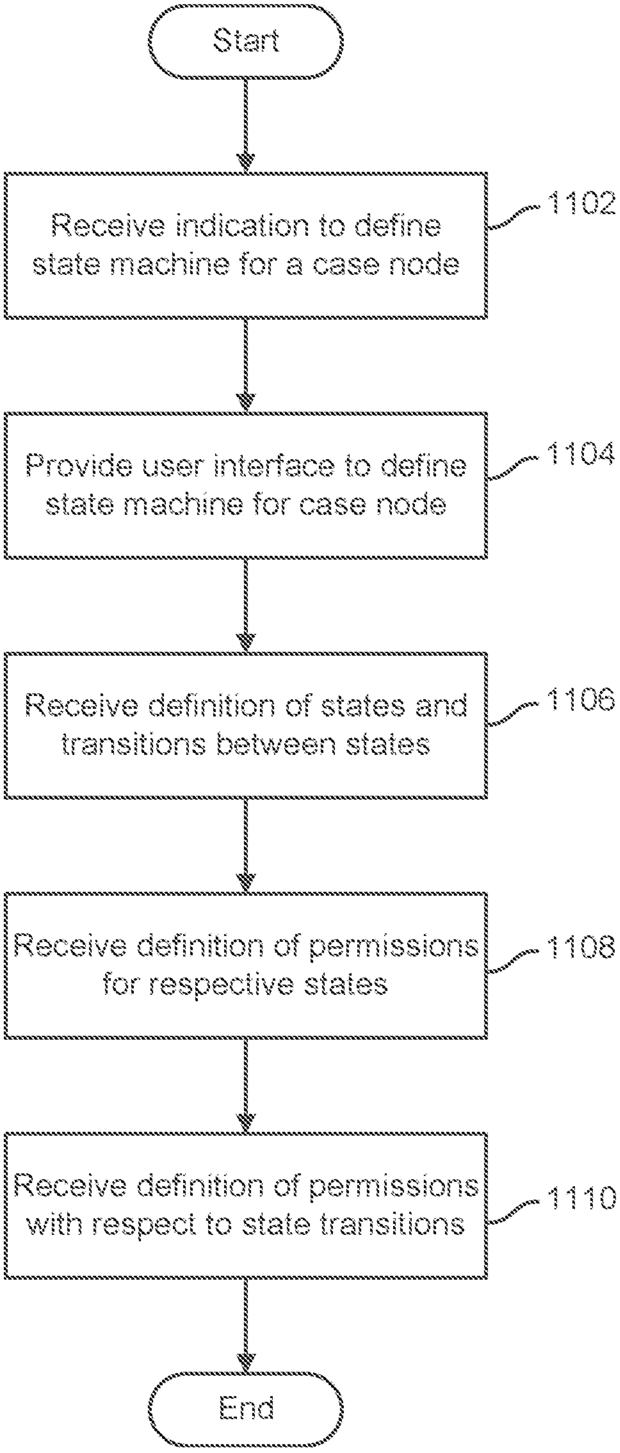
FIG. 11 is a flow chart illustrating an example embodiment of a process to define a state machine for a case node in an embodiment of a case management system.

FIG. 11 is a flow chart illustrating an example embodiment of a process to define a state machine for a case node in an embodiment of a case management system. In various embodiments, the process of FIG. 11 may be performed by a case management system, such as case management system 206 of FIGS. 2 and 3. For example, in some embodiments, a case model development component such as case model development module 304 of FIG. 3 may include a development tool and/or feature to enable a state machine to be defined and associated with a case node, using the process of FIG. 11.

In the example shown in FIG. 11, an indication to define a state machine for a case node is received (1102). For example, a developer using a case model definition tool, service, and/or interface may select a case node and provide an input indicating that a state machine is desired to be defined for and associated with the selected node. A developer user interface to define a state machine for the case node is provided (1104). A definition of two or more states and transition(s) between them is received (1106). A definition of permissions associated with the respective states, e.g., who may access content or metadata associated with the case node while the state machine is in that state, is received (1108). A definition of permissions associated with transitions between the respective states, e.g., who may cause each transition to occur, is received (1110). In various embodiments, a state machine defined for a case node using the process of FIG. 11 may be included in the case model definition as stored and deployed, e.g., in a corresponding portion of an XML or other structured data file comprising the case model definition.

In various embodiments, any case node or case leaf node comprising a hierarchical/nested container model of a case model may be designated as a placeholder. When an instance of case model or a specific case node is created, placeholders are created for each of the containers or leaf nodes (e.g., documents) marked as such in the case model.

Figure 12:
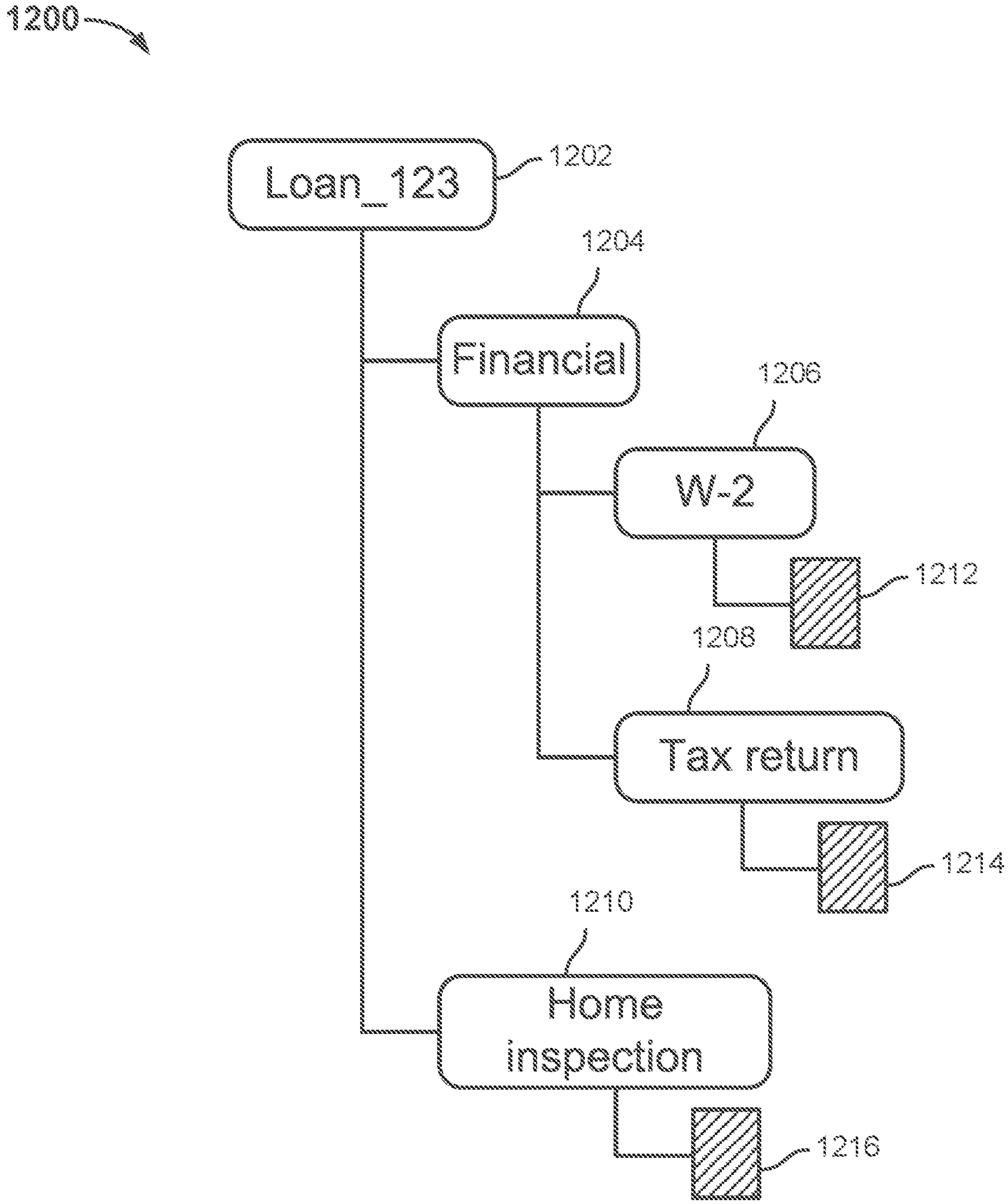
FIG. 12 is a block diagram illustrating an example embodiment of a hierarchical/nested container comprising a case management instance that includes placeholders.

FIG. 12 is a block diagram illustrating an example embodiment of a hierarchical/nested container comprising a case management instance that includes placeholders. In some embodiments, a case model comprising a data model such as the one shown in FIG. 12 may be used by a case management system, such as case management system 206 of FIGS. 2 and 3, to create and manage case instances. For example, a case instance including placeholders, such as the one shown in FIG. 12, may be created based on a case model definition.

In the example shown in FIG. 12, hierarchical/nested container 1200 is associated with an instance of a loan application case type. The container 1200 includes a root node 1202, labeled "Loan_123" in this example, for example to identify the instance as being of the type "Loan". The label "Loan_123" in this example identifies the container instance 1200 as being associated with a specific instance of the "Loan" case type. Below the root node 1202, in this example, there are sub-nodes 1204 and 1210, labeled "Financial" and "Home inspection", respectively. For example, the "Financial" sub-tree including node 1204 and child nodes 1206, 1208, 1212, and 1214, may be used in various embodiments to hold metadata, provide behaviors, and store documents (e.g., in leaf nodes 1212 and 1214). Likewise, the "Home inspection" node 1210 has a leaf node 1216, which may be used, for example, to hold a home inspection report or other document.

In the example shown in FIG. 12, placeholders have been created and stored for leaf nodes 1212, 1214, and 1216. In various embodiments, the placeholders may comprise placeholder documents or other content items, or pointers to such content items. Placeholder documents or other content items, in various embodiments, are not actual user (e.g., loan applicant) documents or data. Instead, the presence of such placeholders enables associated behaviors to be performed. For example, in some embodiments presence of a placeholder document may trigger a behavior to prompt a user to replace the placeholder with a corresponding user document. For example, an expiration period or due date may become associated with the placeholder upon instantiation, resulting in a reminder being generated to replace the placeholder document prior to expiration of the applicable period.

While in the example shown in FIG. 12 the placeholders are documents associated with case leaf nodes, in other embodiments a placeholder may be included as a case node and/or as metadata and/or user data associated with a case node.

Figure 13:
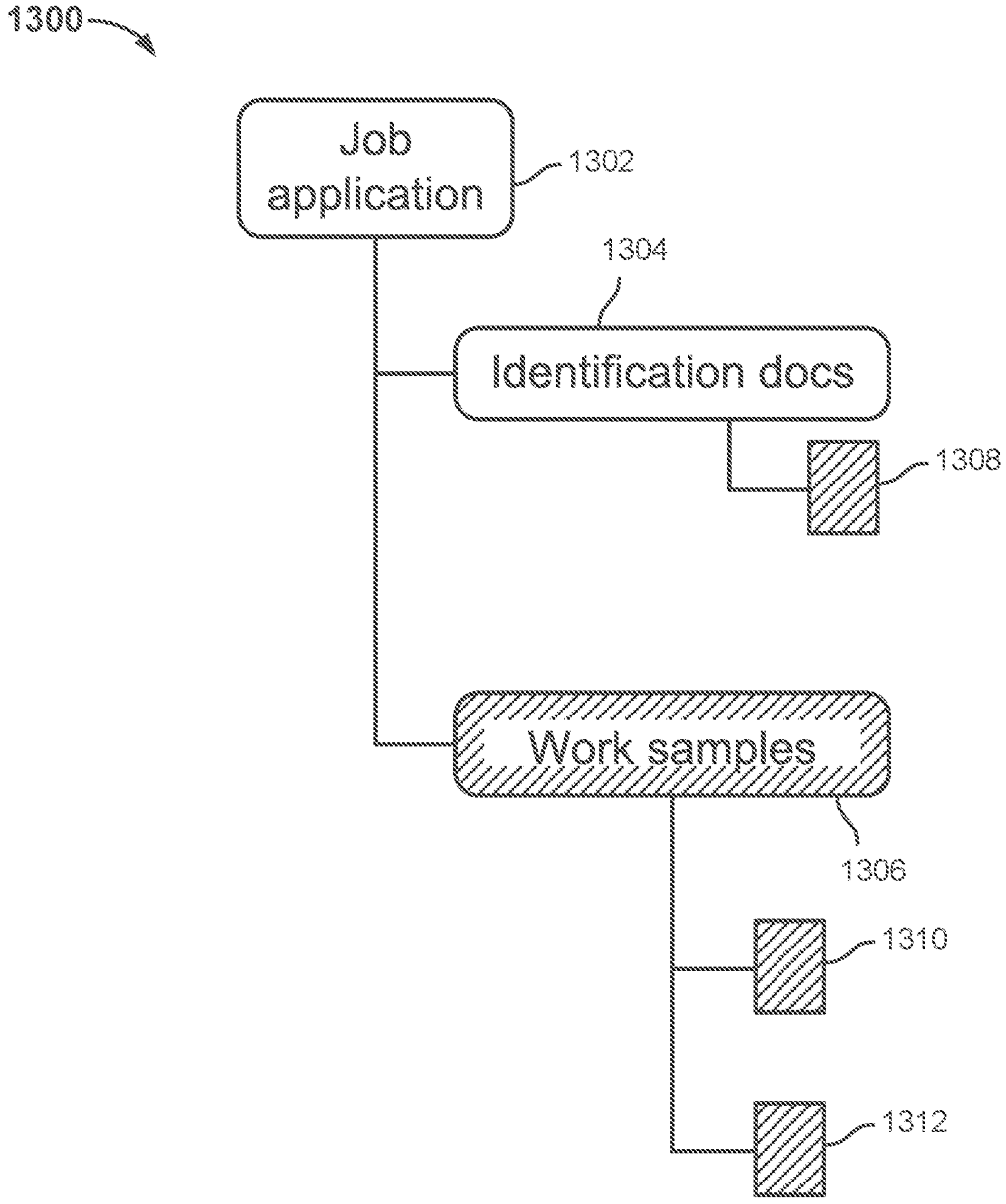
FIG. 13 is a block diagram illustrating an example embodiment of a case model that includes placeholders.

FIG. 13 is a block diagram illustrating an example embodiment of a case model that includes placeholders. In some embodiments, a case model comprising a data model such as data model 1300 shown in FIG. 13 may be used by a case management system, such as case management system 206 of FIGS. 2 and 3, to create and manage case instances. For example, a case instance including placeholders, such as the one shown in FIG. 13, may be created based on a case model definition.

In the example shown, a hierarchical/nested container instance 1300 includes a root node 1302 and container nodes 1304 and 1306. Container node 1304 includes a placeholder case leaf node 1308. The case leaf node 1308 in this example comprises a placeholder document. In some embodiments, upon creation of a new instance of a "job application" based on the case model shown in FIG. 13, a placeholder document is associated with the instance of case leaf node 1308 included in the case instance. The presence of the placeholder document associated with case leaf node 1308 in various embodiments may result in associated behaviors, such as a notification to replace the placeholder with a form of identification that satisfies criteria defined in the case model of FIG. 13, in this example.

In addition, in the example shown in FIG. 13 the container node 1306 of case model 1300 is a placeholder container node. In this example, the presence of placeholder node 1306 in a case instance based on case model 1300 may result in associated behaviors, such as preventing further processing until the placeholder container has been replaced with a container that satisfies requirements defined in the case model 1300. For example, upon creation of a new instance of a "job application" based on case model 1300, the case instance may include a placeholder container corresponding to container node 1306 of FIG. 13, along with two placeholder documents 1310 and 1320. The case model 1300 may include a definition of requirements that the placeholder container 1306 and associated placeholder documents be replaced by a container (e.g., a folder, archive, etc.) uploaded by the applicant and containing at least two samples of the applicant's written work, to replace placeholder documents 1310 and 1312, in this example.

In some embodiments, not shown in FIG. 13, a placeholder container may include a definition of requirements that must be satisfied by a container uploaded to replace the placeholder container, including required content (e.g., documents), but may not necessarily include placeholder documents (or other case leaf nodes) in the placeholder container.

Figure 14:
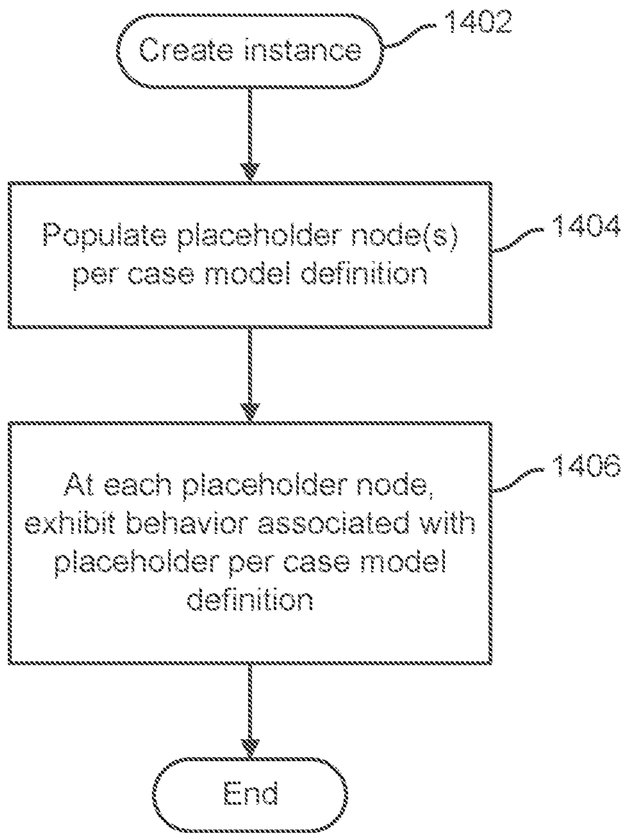
FIG. 14 is a flow chart illustrating an example embodiment of a process to include placeholders in a case instance.

FIG. 14 is a flow chart illustrating an example embodiment of a process to include placeholders in a case instance. In various embodiments, a case management system, such as case management system 206 of FIGS. 2 and 3, may implement the process of FIG. 14. In some embodiments, the process of FIG. 14 may be used to create case instances that include placeholders, such as those shown in FIGS. 12 and 13.

In the example shown, upon receiving an indication to create a new case instance (1402), an associated case model is used to create a new instance, including by populating nodes or sub-nodes with placeholder nodes, data, and/or documents, as indicated in the applicable case model definition (1404). At each placeholder node, behavior(s) associated with presence of the placeholder is/are exhibited, as defined in the case model definition (1406).

Figure 15:
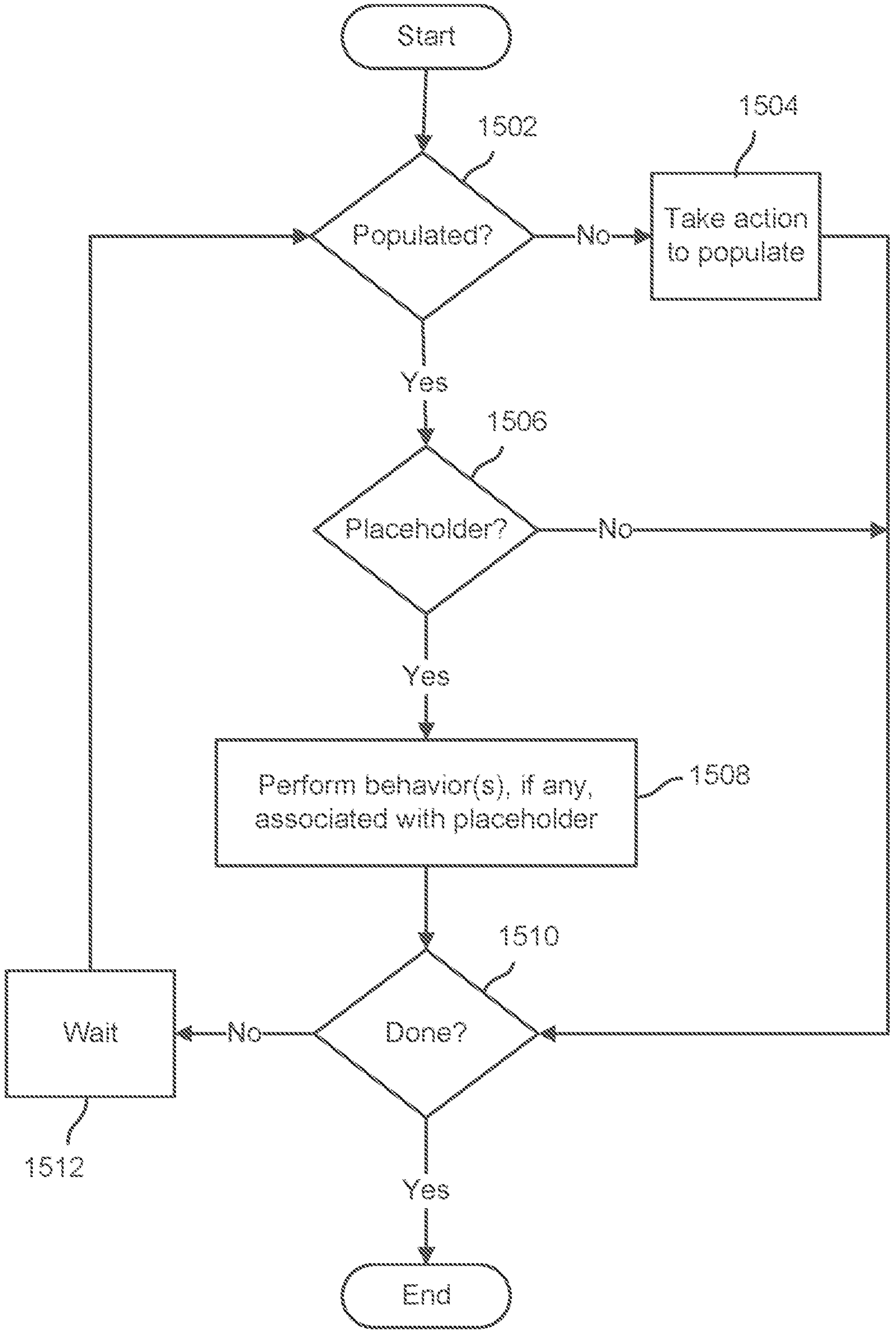
FIG. 15 is a flow chart illustrating an example embodiment of a process to use and/or replace placeholders in a case instance.

FIG. 15 is a flow chart illustrating an example embodiment of a process to use and/or replace placeholders in a case instance. In some embodiments, step 1406 of FIG. 14 may include the process of FIG. 15. In the example shown, a case node comprising a case instance is evaluated to determine whether the case node is populated with data and/or documents or other content items, as required by the applicable case model definition (1502). If the node is not (fully) populated (1502), action is taken to cause the node to become populated (1504). For example, a user may be prompted to provide the required data. If the node is populated (1504), a determination is made as to whether the node is populated with a placeholder, as opposed to user data (1506). For example, a flag or other data value may be set, e.g., at instantiation, to indicate that what the node has been populated with is a placeholder. If the node is populated with a placeholder (1506), one or more behaviors associated with the presence of the placeholder are performed (1508). Once such behaviors have been performed, or if the node has been determined to have already been populated by user data (i.e., not a placeholder), a determination is made as to whether processing is done (1510). In the case, for example, that a placeholder was determined previously to have been present (1506), the process may advance to a wait period (1512), after which a further iteration of applicable ones of steps 1502, 1506, and 1508 may be performed, for example, to determine whether the placeholder has been replaced with user data. If not, in some embodiments a further (or repeat) behavior may be exhibited at step 1508, for example a further or follow up notification to the user to replace the placeholder with user data. Once processing is done (1510), e.g., the placeholder, if any, has been replaced by user data, the process ends.

In one further example, a case model to manage an engineering development project that includes inputs to be provided by third party suppliers may include placeholder container and/or placeholder document nodes, e.g., to ensure deliverables from third party contributors are received, and that other aspects of the case proceed in a desired sequence relative to receipt of such deliverables. For example, a case model may include a placeholder container node for an "Electrical Deliverable" with two placeholder documents, such as "Wiring Diagram" with a due date of "Oct. 10, 2014" and "Supporting Engineering Specifications" with a due date of "Nov. 10, 2014". These placeholders may be considered to be filled when their respective documents are uploaded by the third party contractor. Until then there could be a rule that would prevent submission of the Electrical Deliverable for review. For example, replacement of the placeholders could be a precondition for a phase/state transition, e.g., to "Pending Review" from "Open", of a state machine associated with the case node and/or a parent case node.

Use of placeholder documents and/or other case nodes or sub-nodes in various embodiments enables associated behaviors to be exhibited to facilitate management of cases, e.g., even when applicable users have not yet provided all required documents and/or other user data and content. In various embodiments, a placeholder node may be used to impose requirements and exhibit other behaviors, such as requirements which must be satisfied by a document and/or container provided to replace a placeholder, requiring that a placeholder be replaced prior to other processing advancing, etc., thereby providing a more fine degree of control and management over the progress of each case.

Although the foregoing embodiments have been described in some detail for purposes of clarity of understanding, the technology is not limited to the details provided. There are many alternative ways of implementing the technology. The disclosed embodiments are illustrative and not restrictive.

What is claimed is:

1. A method of case management, the method comprising:
receiving an indication to create a new case instance;
loading a case model definition defining a case model, wherein the case model includes a placeholder case node that is designated as a placeholder in the case model;
parsing the case model definition to generate runtime data structures representing a hierarchy of case nodes to be used to create the case instance and placeholder data to be associated with the placeholder case node, wherein creating the case instance includes associating the placeholder data with the placeholder case node in the case instance as created, wherein a placeholder container corresponding to the placeholder case node in the case instance includes a definition of content requirements to be satisfied by a container in order to replace the placeholder container, including required content items of a specific type, with the container;
controlling replacement of the placeholder data for the placeholder case node with data satisfying a criteria of the case model definition, wherein the placeholder data includes a state transition of a state machine that is user-defined by a per case-node definition for the placeholder case node; and
evaluating the placeholder case node to determine whether the placeholder case node is populated by content items as required by the definition of content requirements of the placeholder container.

2. The method of claim 1, wherein the case instance includes a behavior, defined in the case model definition, that comprises taking an action with respect to the placeholder data.

3. The method of claim 1, wherein the placeholder data comprises a placeholder document.

4. The method of claim 3, wherein the case instance includes a behavior, defined in the case model definition, that includes taking an action associated with replacing the placeholder document with a corresponding document associated with the case instance.

5. The method of claim 4, wherein the action includes prompting a user to replace the placeholder document with a user document.

6. The method of claim 1, wherein the placeholder data comprises a placeholder case node.

7. The method of claim 1, wherein the placeholder data comprises metadata associated with the case node.

8. The method of claim 1, further comprising receiving user data to replace the placeholder data.

9. The method of claim 8, further comprising replacing the placeholder data with the user data.

10. The method of claim 1, further comprising receiving and storing the case model definition.

11. The method of claim 10, wherein receiving and storing the case model definition includes receiving, via a case model definition interface, an indication to include the placeholder data in the case model definition.

12. A case management system, comprising:

a storage device configured to store a case model definition; and a processor coupled to the storage device and configured to control progress of processing of a case in a case management system by:

receiving an indication to create a new case instance;

loading a case model definition defining a case model, wherein the case model includes a placeholder case node that is designated as a placeholder in the case model;

parsing the case model definition to generate runtime data structures representing a hierarchy of case nodes to be used to create the case instance and placeholder data to be associated with the placeholder case node, wherein creating the case instance includes associating the placeholder data with the placeholder case node in the case instance as created, wherein a placeholder container corresponding to the placeholder case node in the case instance includes a definition of content requirements to be satisfied by a container in order to replace the placeholder container, including required content items of a specific type, with the container;

controlling replacement of the placeholder data for the placeholder case node with data satisfying a criteria of the case model definition, wherein the placeholder data includes a state transition of a state machine that is user-defined by a per case-node definition for the placeholder case node; and evaluating the placeholder case node to determine whether the placeholder case node is populated by content items as required by the definition of content requirements of the placeholder container.

13. The system of claim 12, wherein the placeholder data comprises a placeholder document.

14. The system of claim 13, wherein the case instance includes a behavior, defined in the case model definition, that includes taking an action associated with replacing the placeholder document with a corresponding document associated with the case instance; and wherein the processor is further configured to take the action as defined in the case model definition.

15. The system of claim 14, wherein the action includes prompting a user to replace the placeholder document with a user document.

16. The system of claim 12, wherein the processor is further configured to receive user data to replace the placeholder data.

17. A computer program product for case management, the computer program product being embodied in a non-transitory computer readable storage medium and comprising computer instructions for:

receiving an indication to create a new case instance;

loading a case model definition defining a case model, wherein the case model includes a placeholder case node that is designated as a placeholder in the case model;

parsing the case model definition to generate runtime data structures representing a hierarchy of case nodes to be used to create the case instance and placeholder data to be associated with the placeholder case node, wherein creating the case instance includes associating the placeholder data with the placeholder case node in the case instance as created, wherein a placeholder container corresponding to the placeholder case node in the case instance includes a definition of content requirements to be satisfied by a container in order to replace the placeholder container, including required content items of a specific type, with the container;

controlling replacement of the placeholder data for the placeholder case node with data satisfying a criteria of the case model definition, wherein the placeholder data includes a state transition of a state machine that is user-defined by a per case-node definition for the placeholder case node; and evaluating the placeholder case node to determine whether the placeholder case node is populated by content items as required by the definition of content requirements of the placeholder container.

18. The computer program product of claim 17, wherein the placeholder data comprises a placeholder document.

19. The computer program product of claim 18, wherein the case instance includes a behavior, defined in the case model definition, that includes taking an action associated with replacing the placeholder document with a corresponding document associated with the case instance.

20. The computer program product of claim 19, wherein the action includes prompting a user to replace the placeholder document with a user document.

* * * * *